US006989734B2

(12) United States Patent
Thomas

(10) Patent No.: US 6,989,734 B2
(45) Date of Patent: Jan. 24, 2006

(54) MODULATED DATA TRANSFER BETWEEN A SYSTEM AND ITS POWER SUPPLY

(75) Inventor: Keith Thomas, Vermillion, SD (US)

(73) Assignee: Gateway Inc., Irvine, CA (US)

( * ) Notice: Subject to any disclaimer, the term of this patent is extended or adjusted under 35 U.S.C. 154(b) by 126 days.

(21) Appl. No.: 10/761,968

(22) Filed: Jan. 21, 2004

(65) Prior Publication Data

US 2004/0153543 A1 Aug. 5, 2004

Related U.S. Application Data

(60) Provisional application No. 60/443,078, filed on Jan. 28, 2003.

(51) Int. Cl.
*H04M 11/04* (2006.01)

(52) U.S. Cl. .......................... 340/310.01; 340/310.02; 375/220; 307/3

(58) Field of Classification Search ........... 340/310.01, 340/310.02, 310.03, 310.06, 310.07, 310.08; 375/220, 286; 307/3, 7
See application file for complete search history.

(56) References Cited

U.S. PATENT DOCUMENTS

| | | | | |
|---|---|---|---|---|
| 4,962,496 | A * | 10/1990 | Vercellotti et al. | 370/204 |
| 5,257,006 | A * | 10/1993 | Graham et al. | 340/310.06 |
| 5,404,127 | A * | 4/1995 | Lee et al. | 340/310.02 |
| 5,485,040 | A * | 1/1996 | Sutterlin | 307/3 |
| 5,491,463 | A * | 2/1996 | Sargeant et al. | 340/310.01 |
| 5,574,748 | A * | 11/1996 | Vander Mey et al. | 375/139 |
| 5,870,016 | A * | 2/1999 | Shrestha | 340/310.02 |
| 6,034,988 | A * | 3/2000 | VanderMey et al. | 375/134 |
| 6,243,413 | B1 * | 6/2001 | Beukema | 375/222 |
| 6,373,377 | B1 | 4/2002 | Sacca et al. | |

FOREIGN PATENT DOCUMENTS

EP 1050974 A2 11/2000

* cited by examiner

*Primary Examiner*—John Tweel, Jr.
(74) *Attorney, Agent, or Firm*—Frank Lieberan

(57) ABSTRACT

A power supply that includes networking capabilities where networking data is sent and received to and from other systems over the power line and to and from the rest of the system that is being powered over the power supplies output power. The power supply can be included within a system or be external to the system, but in either case, the data from the network is transferred to and from the rest of the system over the same cables that are used to transfer output power from the power supply to the system.

39 Claims, 4 Drawing Sheets

MODULATED DATA TRANSFER BETWEEN A SYSTEM AND ITS POWER SUPPLY

BACKGROUND OF THE INVENTION

This application is related to, and claims priority to U.S. provisional application No. 60/443,078, filed Jan. 28, 2003, entitled “APPARATUS AND METHODS OF NETWORKING DEVICES, SYSTEMS AND COMPUTERS VIA POWER LINES”, the entirety of which is incorporated by reference herein, including all of the documents referenced therein. Additionally, this application is related to U.S. application titled, “POWER SUPPLY WITH MODULAR INTEGRATED NETWORKING,” which was filed on even date herewith; application Ser. No. 10/762,046 and inventor Mark Rapaich. Additionally, this application is related to U.S. application titled, “HOME POWER LINE NETWORK CONNECTED PHONE,” which was filed on even date herewith; Ser. No. 10/761,994 and inventor Frank Liebenow.

FIELD OF THE INVENTION

The present invention generally relates to the field of power supplies where the power supply serves not only as a conduit for power coming into a system, but also serves as a conduit for network data to come in and out of a system. The present invention provides a method of transferring network data between the host system and its power supply using the same cables that are also used to transfer conditioned power from the power supply to the host system.

BRIEF DESCRIPTION OF THE RELATED ART

There are several forms of networking available today. These include networking over dedicated wires such as IEEE Standard 802.3, wireless networking such as IEEE Standard 802.11 and, more recently, networking over existing wires, including phone lines (Home Phone Line Alliance) or power lines (HomePlug™ Power Line Alliance and X.10 standards). Each form of networking has its advantages and disadvantages. For example, an advantage of wireless networking allows the user to roam anywhere within range of an Access Point and a disadvantage of such would be lower transmission throughput. Networking over power lines has recently become viable with technology promoted by the HomePlug™ Powerline Alliance. This technology could be especially useful for systems that generally require an external power source when operating. For example, a desktop computer or a printer most likely will be plugged into a standard power source such as 120V AC in order to operate. Even systems that have secondary power sources such as notebook computers that have rechargeable batteries are predominately used while connected to an AC power source.

Current HomePlug™ Powerline Alliance network adaptors use a network interface module that resembles a “wall-wart” power supply. In this, the wall-wart device is plugged into the power source (e.g., 120V AC) and contains the entire power line network adapter which extracts networking signals from the power line and translates them into a standard interface protocol, such as Universal Serial Bus (USB) version 2.0, Firewire (IEEE 1394) or Ethernet. Likewise, interface packets coming from the standard interface protocol are translated into power line networking signals and are modulated onto the power line. The USB interface could be connected by wire or cable to the system, possibly a computer system, a printer or another device that needs a network connection. This method of connecting a system to the power line works, but requires a separate component, e.g., the “wall-wart,” a second cable, and instead of using one outlet for system power, requires a second outlet for the “wall-wart.” Furthermore, it requires a data connection to the system through an external data connector such as a USB Port, Firewire Port or Ethernet Port. This reduces the number of free available external data connectors by one. In summary, the user has more cables to clutter their workspace, less ports available on their system and needs to have an additional outlet to plug in the “wall-wart.”

Being that systems are generally connected to AC power in order to receive operating power, it would be advantageous to integrate the power line networking into a system’s power supply. In that, both can share isolation and protection systems, both can share an enclosure (if needed) and both can share one connection to the AC power source (e.g., 120 V AC). Existing power supplies have no capabilities for power line networking. One way to accomplish this would be by routing the raw AC power to another component outside of the power supply, yet within the system. This would have the adverse affect of exposing components outside of the power supply enclosure to the dangers associated with a direct connection to AC power.

Alternately, providing power line networking could be accomplished by including the complete networking adapter within the power supply. This solution would provide protection from the dangerous AC power, but has the problem of creating a power supply that always has the added cost of integrated power line networking. It also requires a data connection, such as a cable, between the power supply and the host system. Such a solution may be useful if every system uses power line networking, but with all the alternate networking methods available, there are situations where some customers want power line networking, some want wireless and some want dedicated, high-speed connections (e.g., Ethernet). If every power supply included power line networking, then those customers who did not use power line networking would be burdened by the increased cost and reliability issues associated with extra components integrated into their power supply. Manufacturers could offer some systems with the integrated power line networked power supply and some systems with a non-integrated power supply, but this would require careful forecasting and would require a complete power supply replacement should the customer later decide to convert to power line networking. A solution that exhibits these pitfalls is described in U.S. Pat. No. 6,373,377 to Sacca, etal., which describes an approach whereby a large portion of the network adapter is included in every power supply. This approach adds considerable electronics to the power supply, for example, an Analog Front End (AFE), Control Circuitry, Digital to Analog Converters, Analog to Digital Converters and a Digital Interface for connection to the main system.

A solution to the problem of integrating power line networking into every power supply would be to provide a module that could be inserted into the power supply and that module would connect to the AC power source through the power supply and perform all power line network functions.

In either the case where power line networking is integrated into the power supply or where it is integrated as a module that can be added at any time to a power supply, there needs to be a way to transfer network data between the power supply and the host system. In “POWER SUPPLY WITH MODULAR INTEGRATED NETWORKING,” and U.S. Pat. No. 6,373,377, the network data is transferred to the host system using a dedicated cable. Although this works, it requires a separate cable and connectors. Furthermore, in cases where the power supply is remote, the length of this cable may be quite long and may be confusing to the user. In the related art, one method of transferring data over this cable may be using the Universal Serial Bus standard (USB). Use of a USB or similar connection would require the cable connect to the host system, possibly through an external USB or similar jack and would preclude use of that jack for other intended uses. The present invention provides a method of transferring the data without the need for additional cables and connectors, freeing up, perhaps, ports such as USB ports, for other uses.

SUMMARY OF THE INVENTION

The present invention is directed to a power supply that has power line networking capabilities, either integrated within the power supply or added as a module that can be installed into or onto a power supply that is designed to accept such a power line networking module. The present invention is further directed to a method of transferring network data between the power supply and system which uses the power supply without any additional cables. Instead, the network data can be modulated over the power output of the power supply with a modulator/demodulator both in the power supply and in the host system. With this invention, a power line networking enabled power supply can be installed into a system by connecting only the power supply output cables to the system. Then, using modulation techniques, the networking data can flow between the power supply and system over the power cables that also deliver conditioned power to the system.

It should be noted that this invention applies to internal power supplies such as may be found in, for example, personal computers such as desk top and tower systems as well as external power supplies, sometimes known as power bricks such as may be found used with notebook computers, printers and the like. For internal power supplies, this invention has the advantage of eliminating a separate data connection between the power supply and main circuit card, for example mother boards in personal computers, thus reducing cost and clutter while increasing reliability. For external power supplies, this invention has the advantage of eliminated a longer data cable between the power supply (brick) and the system, also reducing cost and clutter while improving reliability. Additionally, this invention doesn't require a separate data connector on the system (e.g., notebook or printer). Without this invention, the data conductor might be a standard interface, such as Universal Serial Bus (USB) and the data cable would plug into one of the standard USB ports, making it unavailable for other intended uses.

It is to be understood that both the forgoing general description and the following detailed description are exemplary only and are not restrictive of the invention as claimed. The general functions of this invention may be combined in different ways to provide the same functionality while still remaining within the scope of this invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently discussed embodiment of the invention, an example of which is illustrated in the accompanying drawings.

Figure 1:
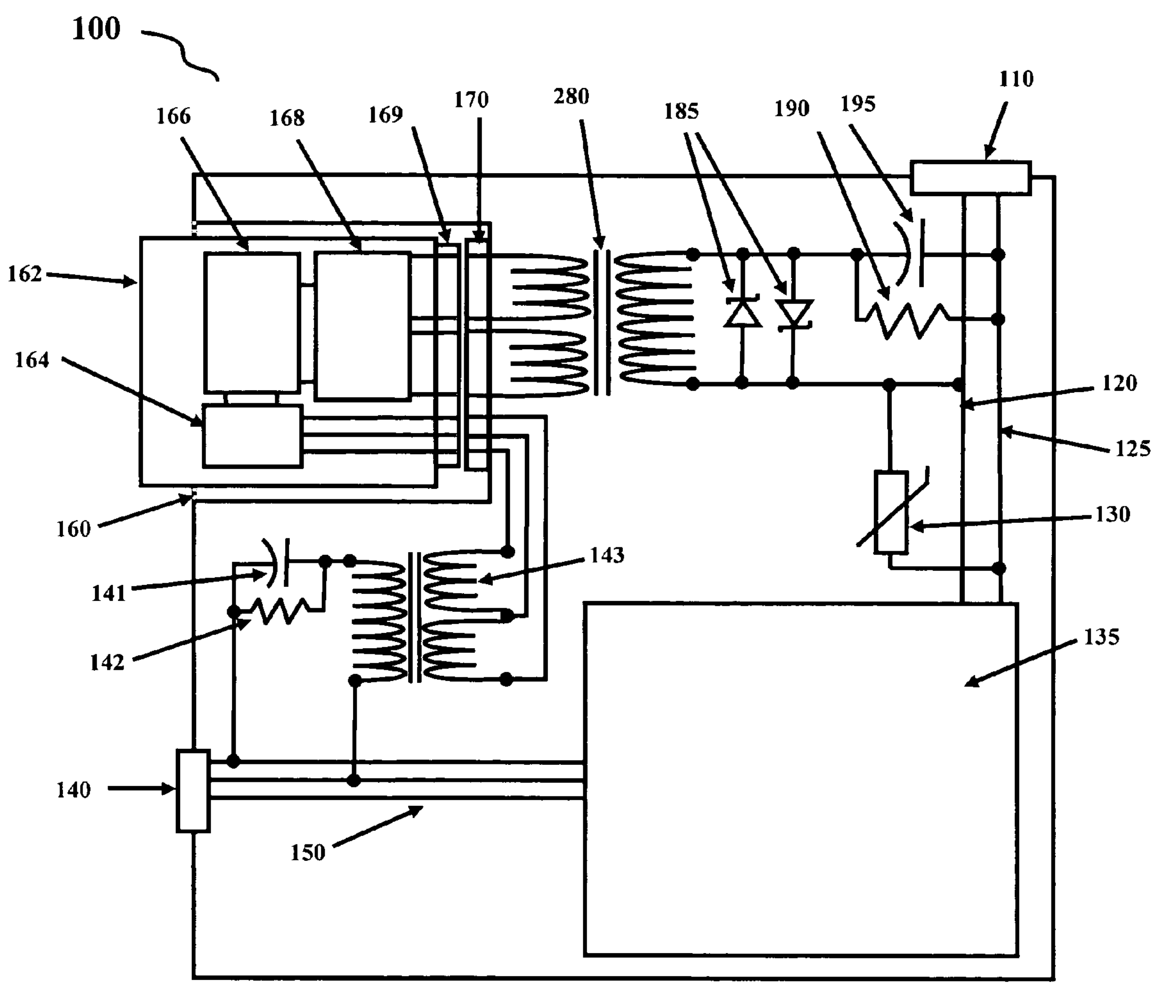
FIG. 1 shows a block diagram of a power supply with modular power line network capability.

Referring to FIG. 1, a block diagram of the present invention shown with a modular networking solution is described. The block diagram of the power supply 100 includes an AC input connector 110 that is coupled to a standard power conversion circuit 135 through paths 120 and 125. Power conversion circuit 135 can be any type known in the art, possibly a switching regulator or chopping regulator, for example. Power conversion circuit 135 typically takes as input an AC voltage from 100VAC to 240VAC and converts it to an AC or DC voltage, possibly 3.3VDC, 5VDC, 24VAC, 48VAC, 48VDC, +12VDC and −12VDC, as an example. Power conversion circuit 135 can be a circuit similar or the same as an existing standard power supply conversion circuit, with or without modifications. Power conversion circuit 135 may connect to an power output connector 140 through wires 150, though it is well known in the art for power supplies to not have an power output connector 140 and instead, have one or more power output cables 150 extending outside of the power supply's case or frame with connectors at each end to connect to various system components, for example mother boards, optical drives and hard disk drives. The diagram is shown as it is for simplicity purposes being that the connection means is well known in the industry and may not affect this invention.

Included in the power supply of FIG. 1 is a slot 160 for receiving a power line networking module 162 and components required by a power line networking standard to couple to the power line as well as isolate the network module from potentially dangerous voltages, spikes and noise. Although shown in this example as a slot, in which the networking module is inserted, in other embodiments, this invention is configured as a networking module attached to the outside of the power supply or connected to the power supply. The coupling components shown are those currently recommended for power line networking and are shown only as an example. As power line networking implementations change, perhaps to achieve higher throughput or reliability, these components may change. The coupling components consist of a coupling capacitor 195 and coupling resistor 190, diodes 185, transformer 180 and varistor 130. Although component values are not the subject of this invention, typically, these components may be 0.01 uf at 275V for capacitor 195, 400 kilo-ohm, 5%, ⅛ Watt for resistor 190, 6V, low-capacitance TVS DO-204AC (SAC 6.0) for diodes 185, 470V, 1250 Amp MOV (EZR-V07D471) for varistor 130 and transformer 180 is a custom signal coupling transformer. Connector 170 is provided for connection to the modular power line network module 162. Although in this embodiment, the power line networking interface is shown as a module that can be inserted into the power supply based on customer preference, this invention is equally adaptable to having the entire power line networking interface fully integrated into the power supply or mounted on the external surface of the power supply. If the power line networking module is integrated into the power supply, it is possible to have the power line networking components mounted on the same circuit board as the power conversion components, or on a different circuit card or daughter card. Any variations to this do not limit the disclosed invention.

Connector 169 of power line networking module 162 mates with connector 170 and passes signals between the power line networking module's 162 components and transformer 180. As shown, transformer 180 has two primary windings and one secondary winding. In the current power line networking implementation, each primary winding corresponds to one of a transmit winding and a receive winding. This is shown as an example of a current implementation and is not meant to limit this invention. Transformer 180 can have any number of primary and secondary windings or can be any device that provides similar signal conversion along with adequate power-line voltage isolation.

Additionally, connector 169 of power line networking module 162 mates with connector 170 and passes signals between the power line networking module's 162 components and transformer 143 for re-modulating/demodulating data over the power supply's power output. As shown, transformer 143 has two primary windings and one secondary winding. Each primary winding may correspond to one of a transmit winding and a receive winding. This is shown as an example of a current implementation and is not meant to limit this invention in any way. There are many ways known to couple data signals to power transmission lines. Transformer 143 can have any number of primary and secondary windings or can be any device that provides similar signal conversion along with adequate isolation. Transformer 143 is then connected to the power supply's outputs 150 through coupling capacitor 141 and coupling resistor 142. Together, transformer 143, capacitor 141 and resistor 142 comprise the power supply's output power coupling circuit. The modulated data is then sent/received from another system component through the output power connection 140, eliminating the need for separate data wires from the power supply to the system.

Power line networking module 162 may consist of a first analog front-end 168, a digital conversion and control circuit 166, and a second analog front-end 164. The first analog front-end 168 sends and receives signals to and from the power line through connectors 169 and 170 and through coupling capacitor 195 and coupling resistor 190 and communicates directly with the digital conversion and control circuit 166. Digital conversion circuit 166 transforms the analog signal to and from a digital signal and interfaces them to the second analog front-end 164. The second analog front-end 164 sends and receives signals to and from the power output 150 through coupling capacitor 141 and coupling resistor 142 and also communicates directly with digital conversion circuit 166. Digital conversion circuit 166 may contain a processor, digital signal processor or other controller along with necessary components such as crystals and memory, though it is not limited to such. Connectors 169 and 170 may be of various types typically used in the industry. Preferably, connector 169 is the male connector and 170 is the female, but this can be reversed. In one possible embodiment, these connectors are 8 pin header connectors with 0.025" posts at 0.1" centers such as Molex part number 22-03-2081. It should be noted that the host to which the power line networking module communicates may be a computer or any other device requiring a power supply; for example, a printer. It should be noted that, although similar signaling and modulation techniques may be used on both the AC power line and the power output, a different signaling and modulation scheme may be used for the power output due to the fact that the noise and impedance levels on the power output are better controlled. The modulation scheme for the power output can be any known in the industry, including frequency modulation, pulse-width modulation, Orthogonal Frequency Division Multiplexing (OFDM), quadrature modulation, Quadrature Amplitude Modulation (QAM) and the like. Furthermore, although transfer of networking data is shown in this example, it would be a simple extension to also include status and control information for the power supply as well. For example, the main system controller can transmit data to the power supply to control the fan speed and receive information from the power supply regarding it status, such as temperature and fan tachometer readings.

Figure 2:
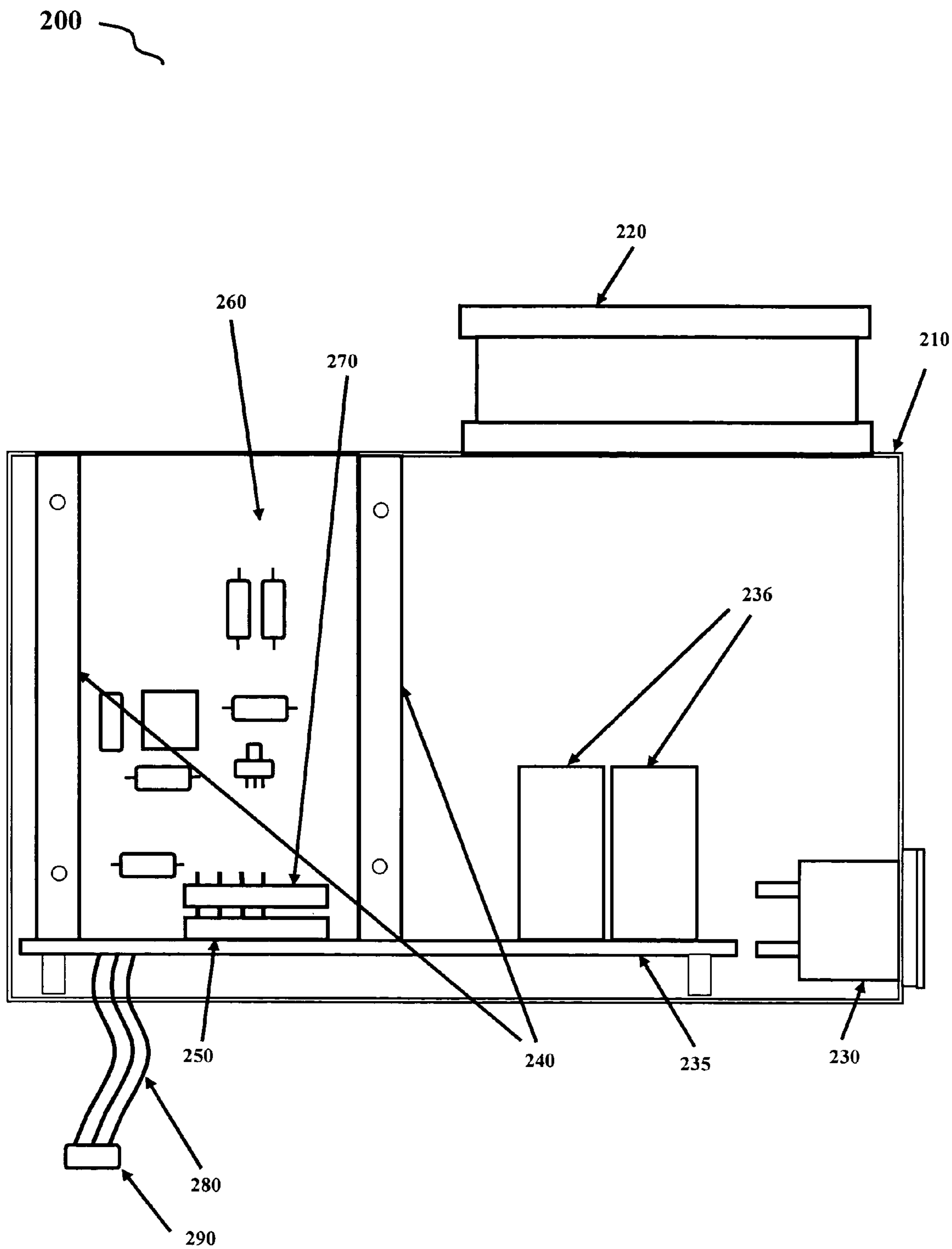
FIG. 2 shows a pictorial diagram of a power supply with a modular power line network capability.

Referring now to FIG. 2, a pictorial diagram of the present invention shown with the networking module inserted is described. The pictorial diagram of the power supply 200 includes an AC input connector 230 that is coupled to a power conversion circuit 235 which may be a printed circuit card having a plurality of components mounted on its upper and/or lower sides. The coupling and isolation components for power line networking (shown in figures FIG. 1) may be mounted on printed circuit card 235. Two of these components are shown as an example 236, though there may be many. Connector 250 is the connector that interfaces the power line networking coupling and isolation components to the power line networking module 260 and is shown mated to connector 270 of power line networking module 260. Power supply 200 may have a fan 220 for cooling purposes. Rails 240 may be provided to guide the insertion of power line networking module 260, but are not necessary for this invention.

Power line networking module 260 is shown inserted into power supply 200. Connector 270 is mated with connector 250 and provides signal continuity between power supply 210 and power line networking module 260. This connector carries decoupled network signals between the AC power and the power line networking circuits and decoupled network signals between the power line networking circuits and the power outputs 280. Shown in this example are power output cables 280 that also carry re-modulated data to and from the main system and power connector 290 for connecting power and networking to components of the main system. It should be noted that in many systems such as personal computers, there are generally several sets of power cables (280), each with an individual connector (290) and the configuration shown is for simplicity purposes. One of the intents of the invention is to transfer networking data between the main system, for example the mother board of a personal computer, and the power line networking interface embedded within the power supply. Various exemplary components are also shown on power line networking module 260. Additionally, the complete power line networking solution including decoupling and isolation components may be mounted on one circuit card and completely housed within power supply 210. It is also possible that all said components are mounted upon circuit card 235 or upon a daughter card that is connected to circuit card 235. It is also possible that the power line networking module may be attached to the outside case of the power supply 210 through a connector similar to connector 250 and held to the case with one or more mechanical fasteners, clips, hinges or the like.

Figure 3:
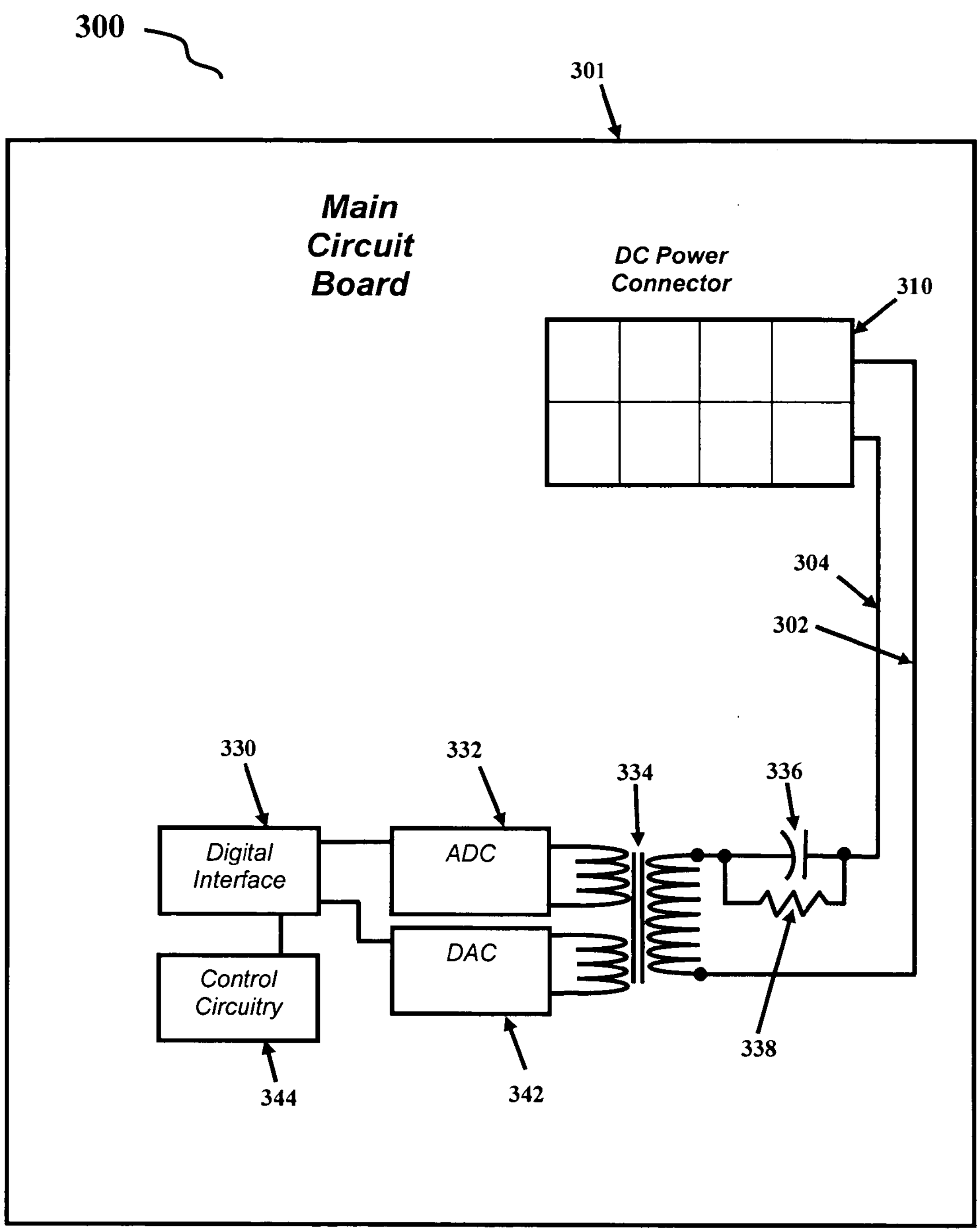
FIG. 3 shows a block diagram of a main circuit board with components for sending and receiving data signals to and from the power supply by modulating and demodulating the data signals on the DC power line.

Referring now to FIG. 3, an example of an interface to the re-modulated networking system located within the main system is shown. In this example, the interface is shown integrated upon main circuit card 301, possibly the mother board of a personal computer or the control board of a printer for example. Though the interface is shown in block form mounted upon the main circuit board, there is nothing that may preclude the interface from being mounted on a separate circuit card that may plug into the main circuit card, for example, a daughter card.

Continuing with FIG. 3, power for the main circuit board is received from the power supply of FIG. 1/FIG. 2 through connector 310. The power signals carrying the re-modulated network data 302 and 304 are routed to a coupling circuit that passes the re-modulated data to a conversion circuit while blocking the power signals. An example coupling circuit is shown consisting of coupling capacitor 336, coupling resistor 338 and coupling transformer 334. Although component values are not the subject of this invention, typically, these components may be 0.01 uf at 275V for capacitor 336, 400 kilo-ohm, 5%, ⅛ Watt for resistor 338, and transformer 334 is a custom signal coupling transformer. As shown, this transformer may have two primary windings and one secondary winding, though any configuration of windings may be possible. Each primary winding may correspond to one of a transmit winding and a receive winding. This is shown as an example of a current implementation and is not meant to limit this invention in any way. In this example, one primary winding is connected to Analog-to-Digital converter 332 for receiving network signals from the power supply and another primary winding is connected to Digital-to-Analog converter 342 for sending network signals to the power supply. It should also be noted that there are various other ways to perform similar functions, for example using a Digital Signal Processor and this configuration is shown as an example. Additionally, signaling between the main circuit board and the power supply may be performed in other ways, for example pulse width modulation or frequency modulation. Such signaling means are well known in the industry and using other transmission means does not veer from this invention. Also shown for completeness is control circuit 344 and digital interface 330. Control circuit 344 handles the communications protocols required to send and receive network data to and from the power supply and protocols required to send and receive network data to and from the main circuit card. The network data is sent and received to and from the main circuit card through digital interface 330. This interface may be serial or parallel. It may directly interface to a processor input and output or may connect to the rest of the system through any standard interface such as a serial port (e.g., RS-232), parallel port (e.g., IEEE 284) or a Universal Serial Bus (USB) connection.

Figure 4:
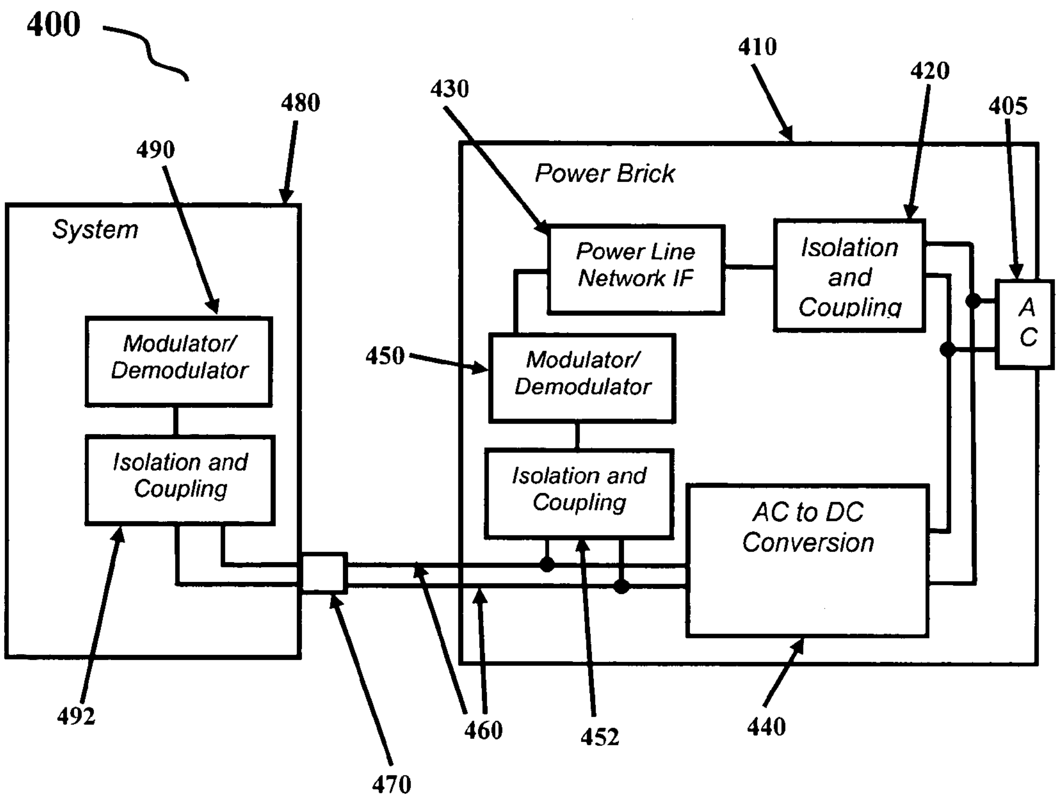
FIG. 4 shows a block diagram of system having an external power supply connected through a power cable.

Referring now to FIG. 4, an example of a system having an external power supply connected to it through a power cable is shown. In this example, power supply 410 is external to the system and may be housed inside a sealed container, possibly made of plastic or metal. Many examples of this type of power supply may be found in the industry and they are sometimes referred to as "power bricks" or "wall-warts." In such, these power supplies may plug directly into a power outlet, may have a captured power cord for connecting to a power outlet or may have a replaceable cord for connecting to a power outlet. In the example shown, a connector 405 is provided to connect to a replaceable power cord for connecting to a power outlet. Any configuration for connecting to a power outlet may be provided and does not veer from the intent of this invention.

The input power, usually AC, connects to both the power conversion circuit 440 and the power line isolation and coupling circuit 420. The power conversion circuit 440 typically converts the input power into one or more DC voltages, though it may also convert the input power into an AC voltage without veering from the scope of this invention. Although it is known for these types of power supplies to have multiple output voltages, the example shows an embodiment with a single output. In this example, the power output is conducted on wires 460 through connector 470 to power system 480. Wires 460 may be bundled together in one cable and may be of any length, but usually are between a few feet and a few yards. System 480 may obtain its operating power from the voltages present on wires 460, but for simplicity purposes, the power connections of system 480 to wires 460 are not shown. Generally, the output voltage or voltages may be routed to a power conversion circuit within system 480 to further condition the power and generate whatever voltages are required to operate system 480. For example, if system 480 is a notebook computer, the DC voltages on wires 460 may be 16V to 19V, for example, and the power conversion circuit within system 480 may convert that voltage to voltages required by the components within the notebook computer, for example 3.3V and 5V.

The power line networking isolation and coupling circuit 420 separates the networking signals from the power input and passes them to the power line network interface 430. Likewise, the power line networking isolation and coupling circuit 420 accepts network signals from the power line network interface 430 and passes them to the power line. Power line network interface 430 performs all analog and digital functions required to send and receive data over the power line. Various methods of sending data over the power line are well known including such standards as X.10 and those described by the Home Power Line Networking Alliance and this invention is not limited to any particular standard. Power line network interface 430 is connected to modulator/demodulator 450, which in turn is connected to a coupling circuit 452. Together, they send and receive networking data between power output 460 and the power line networking interface 430. Although the same communication standards and protocols may be used over power output 460 as those used over the AC power lines, there are many known methods to modulate data over AC or DC voltages, especially when there is some control over the noise and impedance of the connection with system 480. These methods include frequency modulation, pulse-width modulation, Orthogonal Frequency Division Multiplexing (OFDM), quadrature modulation, Quadrature Amplitude Modulation (QAM) and the like, for example, but any method can be used without veering from the intent of this invention. These modulated networking data signals pass back and forth between isolation and coupling circuit 452 and a similar isolation and coupling circuit 492 within system 480 over power output cables 460. There is a connection made within system 480 between the power output cables and isolation and coupling circuit 492. Isolation and coupling circuit 492 connects to a second modulator/demodulator 490 where networking data is sent or received. Although not shown for simplicity, second modulator/demodulator 490 is then connected to the rest of system 480 by any of various means known in the art, including possibly a serial or parallel communications link to a processing system within system 480, or the like. The connection means may be a standard interface such as Universal Serial Bus (USB) to an internal or external USB port of system 480 as well. Any connection means is well within the scope of this invention.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A power supply system comprising:
- a power line input;
- a power conversion circuit connected to said power line input that has at least one power output and provides power to a host system;
- a power line networking signal coupling circuit connected to said power line input;
- an output power coupling circuit connected to one of said at least one power output; and
- a power line networking interface connected to said power line networking signal coupling circuit adapted to receive power line networking signals from said power line input and adapted to send power line networking signals to said power line input, said power line networking interface connected to said output power coupling circuit to receive data signals from said host system and to send data signals to said host system.

2. A power supply system as claimed in claim 1, wherein said power line input is a connector suitable to receive a power cable.

3. A power supply system as claimed in claim 1, wherein said power line networking signal coupling circuit comprises a coupling capacitor and an isolation transformer.

4. A power supply system as claimed in claim 1, wherein said output power coupling circuit comprises a second coupling capacitor and a second isolation transformer.

5. A power supply system as claimed in claim 1, wherein said at least one output comprises at least one of 3.3V DC, 5V DC, 9V DC, 16V DC, 19V DC, 12V DC, −12V DC, 24V AC and 48V DC.

6. A computer system comprising:
- a chassis;
- at least a processor and a memory configured substantially upon a main circuit card;
- a power supply;
- a power line input that connects to said power supply;
- a power conversion circuit connected to said power line input, said power conversion circuit provides at least one power output to power said computer system;
- a power line networking signal coupling circuit connected to said power line input;
- an output power coupling circuit connected to one said at least one power output;
- a power line networking interface connected to said power line networking signal coupling circuit adapted to receive power line networking signals from said power line input and adapted to send power line networking signals to said power line input, said power line networking interface connected to a first modulator/demodulator circuit, said first modulator/demodulator circuit connected to said output power coupling circuit to receive and to send data signals to and from said main circuit card; and
- a second modulator/demodulator circuit located outside of said power supply and connected to said one said at least one power output, said second modulator/demodulator circuit adapted to receive data signals from said first modulator/demodulator circuit over said one said at least one power output and said second modulator/demodulator circuit adapted to send data signals to said first modulator/demodulator circuit over said one said at least one power output.

7. A computer system as claimed in claim 6, wherein said power line input is a connector suitable to receive a power cable.

8. A computer system as claimed in claim 6, wherein said power line networking signal coupling circuit comprises a coupling capacitor and an isolation transformer.

9. A computer system as claimed in claim 6, wherein said output power coupling circuit comprises a second coupling capacitor and a second isolation transformer.

10. A computer system as claimed in claim 6, wherein said second modulator/demodulator is substantially mounted upon said main circuit card.

11. A computer system as claimed in claim 6, wherein said at least one power output comprises at least one of 3.3V DC, 5V DC, 9V DC, 16V DC, 19V DC, 12V DC, −12V DC, 24V AC and 48V DC.

12. A computer system as claimed in claim 6, wherein said first modulator/demodulator circuit uses at least one type of modulation chosen from a group consisting of frequency modulation, pulse-width modulation, Orthogonal Frequency Division Multiplexing (OFDM), quadrature modulation and Quadrature Amplitude Modulation (QAM).

13. A computer system as claimed in claim 6, wherein said second modulator/demodulator circuit uses at least one type of modulation chosen from a group consisting of frequency modulation, pulse-width modulation, Orthogonal Frequency Division Multiplexing (OFDM), quadrature modulation and Quadrature Amplitude Modulation (QAM).

14. An external power supply system comprising:
- a power line input;
- a power conversion circuit connected to said power line input having at least one power output that provides power to a host system through a power cable;
- a power line networking signal coupling circuit connected to said power line input;
- an output power coupling circuit connected to one of said at least one power output; and
- a power line networking interface connected to said power line networking signal coupling circuit adapted to receive and send power line networking signals to and from said power line input, said power line networking interface connected to said output power coupling circuit to send and receive data signals to and from said host system.

15. An external power supply system as claimed in claim 14, wherein said power line input is a connector suitable to recieve a power cord.

16. An external power supply system as claimed in claim 14, wherein said power line networking signal power line coupling circuit comprises a coupling capacitor and an isolation transformer.

17. An external power supply system as claimed in claim 14, wherein said output power coupling circuit comprises a second coupling capacitor and a second isolation transformer.

18. An external power supply as claimed in claim 14, wherein said at least one power output comprises at least one of 3.3V DC, 5V DC, 9V DC, 16V DC, 19V DC, 12V DC, −12V DC, 24V AC and 48V DC.

19. An external power supply as claimed in claim 14, wherein said power cable has a connector adapted to mate with a second connector located on said host system.

20. An external power supply system as claimed in claim 14, wherein said power line networking interface uses at least one type of modulation chosen from a group consisting of frequency modulation, pulse-width modulation, Orthogonal Frequency Division Multiplexing (OFDM), quadrature modulation and Quadrature Amplitude Modulation (QAM).

21. A computer system comprising:

a chassis;

at least a processor and a memory configured substantially upon a main circuit card housed substantially within said chassis;

an external power supply;

a power line input that connects to said external power supply;

a power conversion circuit connected to said external power line input and housed within said external power supply providing at least one power output to said main circuit card;

a power line networking signal coupling circuit connected to said power line input housed within said external power supply;

an output power coupling circuit connected to one of said at least one power output housed within said external power supply;

a power line networking interface connected to said power line networking signal coupling circuit adapted to receive and send power line networking signals to and from said power line input, said power line networking interface connected to a first modulator/demodulator circuit, said first modulator/demodulator circuit connected to said output power coupling circuit to send and receive data signals to and from a second modulator/demodulator, said power line networking interface substantially housed within said external power supply;

an input power coupling circuit connected to said one of said at least one power output located outside of said external power supply; and a second modulator/demodulator circuit located outside of said external power supply and connected to said input power coupling circuit to send and receive data signals to and from said first modulator/demodulator circuit over said one of said at least one power output.

22. A computer system as claimed in claim 21, wherein said power line input is a connector suitable to receive a power cable.

23. A computer system as claimed in claim 21, wherein said power line networking signal coupling circuit comprises a coupling capacitor and an isolation transformer.

24. A computer system as claimed in claim 21, wherein said output power coupling circuit comprises a second coupling capacitor and a second isolation transformer.

25. A computer system as claimed in claim 21, wherein said input power coupling circuit comprises a third coupling capacitor and a third isolation transformer.

26. A computer system as claimed in claim 21, wherein said at least one power output comprises at least one of 3.3V DC, 5V DC, 9V DC, 16V DC, 19V DC, 12V DC, –12V DC, 24V AC and 48V DC.

27. A computer system as claimed in claim 21, wherein said second modulator/demodulator circuit is substantially mounted within said chassis.

28. A computer system as claimed in claim 21, wherein said second modulator/demodulator circuit is substantially mounted upon said main circuit card within said chassis.

29. A computer system as claimed in claim 21, wherein said second modulator/demodulator circuit is substantially mounted upon a daughter card which is substantially mounted upon said main circuit card, said main circuit card substantially mounted within said chassis.

30. A computer system as claimed in claim 21, wherein said first modulator/demodulator uses at least one type of modulation chosen from a group consisting of frequency modulation, pulse-width modulation, Orthogonal Frequency Division Multiplexing (OFDM), quadrature modulation and Quadrature Amplitude Modulation (QAM).

31. A computer system as claimed in claim 21, wherein said second modulator/demodulator uses at least one type of modulation chosen from a group consisting of frequency modulation, pulse-width modulation, Orthogonal Frequency Division Multiplexing (OFDM), quadrature modulation and Quadrature Amplitude Modulation (QAM).

32. A means for providing an external power supply system with power line networking comprising:

a means for housing said external power supply system;

a means for providing power line input that passes through said means for housing;

a means for converting said power line input into at least one output voltage housed within said means for housing;

a first means for coupling to said power line input, said first means for coupling connected to said means for providing power line input, said first means for coupling to said power line input housed within said means for housing;

a second means for coupling to one of said at least one output voltage, said second means for coupling to one of said at least one output voltage housed within said means for housing; and a first means for modulating/demodulating a networking signal coupled to said first means for coupling to said power line input, said first means for modulating/demodulating a networking signals housed within said means for housing; and a second means for modulating/demodulating said networking signal through said second means for coupling to one of said at least one output voltage, said second means for modulating/demodulating said networking signal housed within said means for housing.

33. A means for providing an external power supply system with power line networking as claimed in claim 32, wherein said means for providing power line input is a connector suitable for receiving a power cord.

34. A means for providing an external power supply system with power line networking as claimed in claim 32, wherein said first means for coupling to power line networking signals comprises a coupling capacitor and an isolation transformer.

35. A means for providing an external power supply system with power line networking as claimed in claim 32, further comprising a means for providing a third means for modulating/demodulating said networking signals through a third means for coupling to one of said at least one output voltage, said third means for modulating/demodulating said networking signals housed outside of said means for housing.

36. A means for providing an external power supply system with power line networking as claimed in claim 35, wherein said third means for modulating/demodulating said networking signals through a third means for coupling to at least one of said at least one output voltage is substantially integrated upon a circuit card within a system that is powered by said means for providing an external power supply system with power line networking.

37. A computer system as claimed in claim 32, wherein said first means for modulating/demodulating a networking signal conforms to the Home Power Line Network Association standard.

38. A computer system as claimed in claim 32, wherein said second means for modulating/demodulating said networking signals uses at least one of the following types of modulation for sending and receiving data signals to and from said second modulator/demodulator chosen from a group consisting of frequency modulation, pulse-width modulation, Orthogonal Frequency Division Multiplexing (OFDM), quadrature modulation and Quadrature Amplitude Modulation (QAM).

39. A computer system as claimed in claim 35, wherein said means for providing a third means for modulating/demodulating said networking signals uses at least one of the following types of modulation for sending and receiving data signals to and from said first modulator/demodulator chosen from a group consisting of frequency modulation, pulse-width modulation, Orthogonal Frequency Division Multiplexing (OFDM), quadrature modulation and Quadrature Amplitude Modulation (QAM).

* * * * *